Jan. 15, 1963    F. W. WUNSCH    3,073,571
TRACTOR MOUNTED METAL POST DRIVER
Filed June 15, 1960
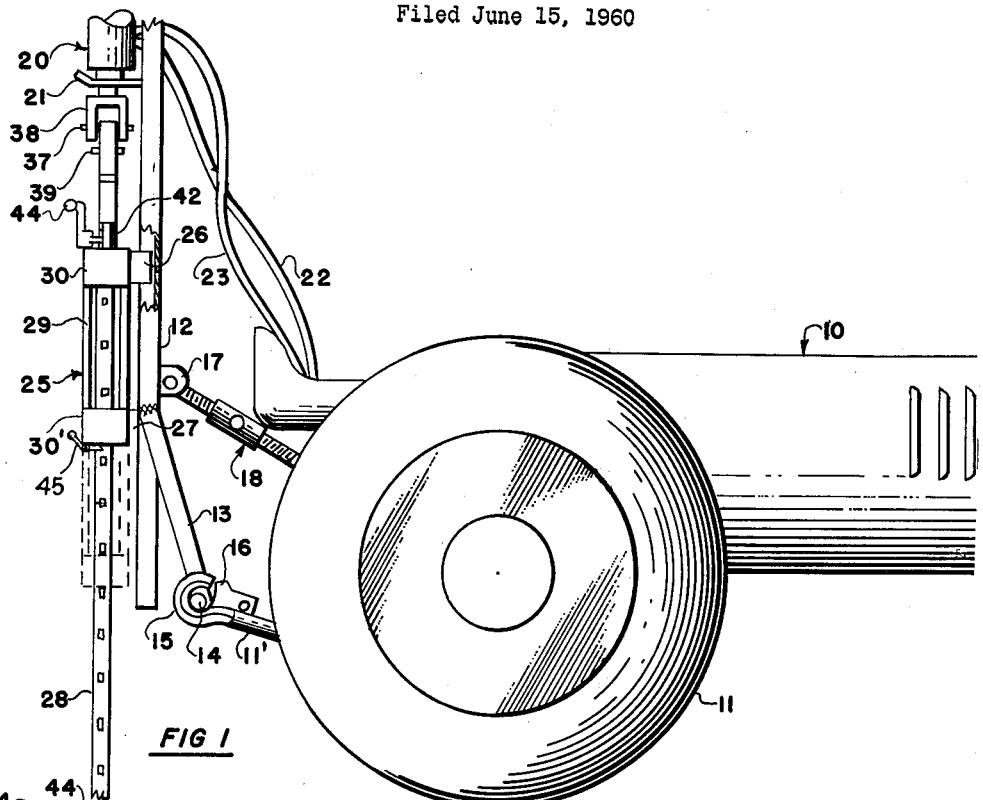
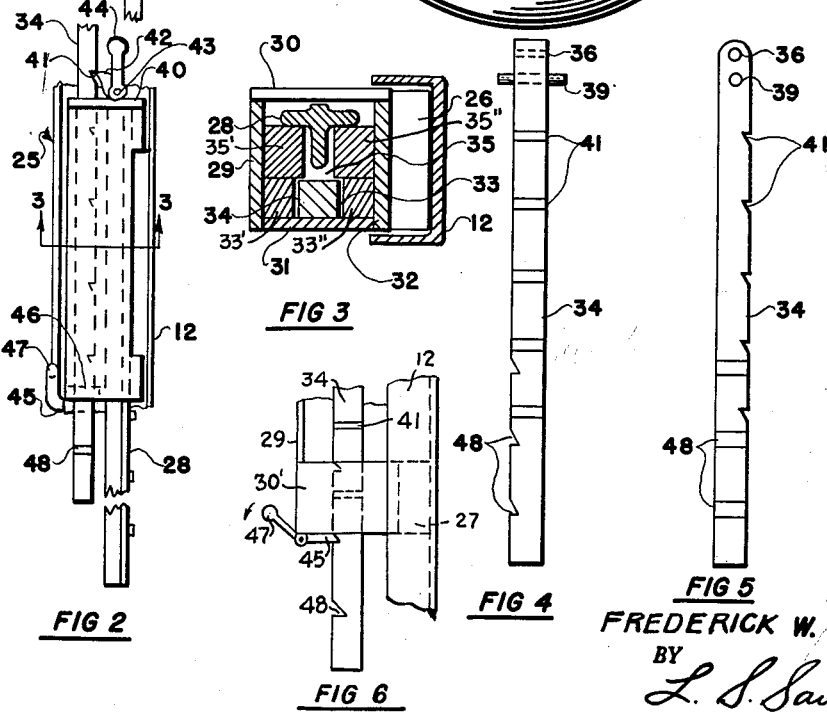
INVENTOR.
FREDERICK W. WUNSCH
BY
L. S. Saulsbury
ATTORNEY

United States Patent Office 3,073,571
Patented Jan. 15, 1963

3,073,571
TRACTOR MOUNTED METAL POST DRIVER
Frederick W. Wunsch, 1400 Sunnyview Drive, Peoria, Ill.
Filed June 15, 1960, Ser. No. 36,247
3 Claims. (Cl. 254—29)

This invention relates to a tractor mounted metal post driver.

It is the principal object of the present invention to provide a post driver that can be supported upon the tractor draw bar at the rear of the tractor and that is adapted to be operated by a hydraulic cylinder taken from the tractor.

It is another object of the present invention to provide a tractor mounted post driver in which a driving box-like structure is used to receive the upper end of the metal fence post to effect the driving action thereupon and wherein the box is adjustably carried upon a ram rod suspended from the hydraulic cylinder and worked in strokes thereby to drive the post.

It is still another object of the invention to provide in a tractor mounted post driver means by which the drive can be lifted at the end of the final stroke from the upper end of the driven fence post and made ready to receive another post.

It is a further object of the invention to provide in the mounting of the post driver upon the tractor means for adjusting the driver fore and aft to adapt it to drive the post straight.

Other objects of the invention are to provide a tractor mounted post driver, having the above objects in mind, which is of simple construction, easy to mount upon the tractor and operate, has a minimum number of parts, durable, efficient and effective in use.

For a better understanding of the invention, reference may be had to the following detailed description taken in connection with the accompanying drawing, in which FIGURE 1 is a side elevational view of the rear of the tractor with the mounting of the post driver of the present invention mounted thereon, FIG. 2 is an enlarged rear elevational view of the post driving box structure with the post therein and with the catch lever adjusted to receive a driving thrust from the ram rod and the power-operated hydraulic cylinder, FIG. 3 is an enlarged cross-sectional view of the post driving box containing ram rod and the post and as viewed on line 3—3 of FIG. 2, FIG. 4 is an enlarged elevational view of the ram rod removed from the driving box and looking upon one notched face thereof, FIG. 5 is an enlarged elevational view similar to FIG. 4 with the ram rod turned horizontally through ninety degrees to show another notched face thereof, and FIG. 6 is a fragmentary side elevational view of the box-like structure looking at the bottom thereof and showing the bottom catch device in engagement with the ram.

Referring now to the figures, 10 represents a tractor having rear supporting wheels 11 and a draw bar 11' on which a vertically-extending channel guide support 12 is mounted by a rearwardly and downwardly-extending support arm 13 fixed by a pin 14 within a forwardly-extending hook formation 15 and closed therein by a top latch 16. The vertically-extending channel support 12 has a forwardly-extending boss 17 to which a turn buckle rod assembly 18 is connected and that is connected to the tractor forwardly thereof. This turn buckle assembly 18 serves to hold the vertically-extending channel guide support 12 in a vertically-extended position and can be adjusted fore and aft when the front and rear wheels of the tractor are not both on level ground.

The vertically-extending channel guide support 12 supports at its upper end a power-operated hydraulic cylinder device 20 that can be rested upon a bracket 21 extending rearwardly from the channel support 12. Hydraulic hose connections 22 and 23 extend from the cylinder device 20 to the tractor hydraulic pump and oil supply normally afforded on tractors for activating hydraulic cylinders and to the usual control means provided therefor.

A driving box-like structure 25 is connected to the vertically-extending channel guide support 12 for vertical sliding movement therein. The box structure 25 has vertically-spaced and inwardly-extending upper and lower guide portions 26 and 27 that are confined within the channel guide support 12 and serve to hold the driving box-like structure 25 against lateral displacement while being adjusted vertically to drive a metal post 28 of T-section. This box-like structure has a rear plate 29, open upper and lower right side parts 30 and 30', and left side plate 31 extending forwardly from the rear plate, and a front plate part 32 from which the upper and lower guide portions 26 and 27 forwardly extend.

Within the box is a vertically-extending guideway 33 that contains a square section vertically-extending ram rod 34. Beside the ram rod guide opening 33 and parallel thereto is a guideway opening 35 in the box-like structure, FIG. 3, for containing and guiding the metal fence post 28. The guideway 33 is formed by two laterally-spaced, vertically-extending block pieces 33' and 33" fixed within the box structure against the left side plate 31. The guideway 35 is provided between laterally-spaced, vertically-extending block pieces 35' and 35" fixed within the box structure respectively against the respective rear and front plates. The ram rod 34 has a transverse hole 36 through which a pin 37 is extended to detachably connect the ram rod 34 to a bifurcated piston shank 38 of the hydraulic cylinder device 20. A transverse cross pin 39 is provided on the upper end of the ram rod 34 to support the ram rod on the top of the driving box-like structure when free of the power operated device piston shank 38 and to keep the ram rod from falling downwardly through the driving box 25.

The driving box-like structure has its rear and side walls formed of aluminum while on the top thereof is an iron or steel drive plate 40 having an opening therein or only partially closing the top of the box for the passage of the ram rod 34 and adapted to abut the upper end of the metal fence post 28 to effect the driving action thereto.

The ram rod 34 has a series of one way notches 41 adapted to be engaged by a weighted top catch 42 pivoted by a pin 43 upon the top driving plate 40 and having a weight arm 44 biasing the catch 42 toward the notches 41. As the power-operated device 20 is actuated to extend the piston shank 38 downwardly, the ram rod 34 will be connected to the driving box structure through the catch 42 and with the post 28 engaging the underside of top plate 40 a driving action will be effected upon the fence post 28 to the extent of one stroke of the power-operated device 20 and the post will be forced into the ground a distance of from eight to ten inches.

On the lower end of the driving box 25 is another weighted catch device 45 that is connected by a hinge 46 to the lower end of the box structure 25 and is urged by a weight 47 into engagement with notches 48 on the lower end of the ram rod 34 so as to support the box structure 25 upon the ram rod. To lift the ram rod 34 free of the box structure for another stroke, the catch device 45 is released from the ram rod 34 to permit the ram rod to be retracted by the power-operated device 20. On the next stroke the top catch device 42 will enter a lower notch 41 on the ram rod 34 and the driving box structure 25 will be moved downwardly to force the post further into the ground. Since the movement of each stroke may be eight to ten inches it is only necessary to take two or three strokes to complete the post driving operation. The top catch device 42 works automatically while the post is being driven by the box structure 25. The catch device 45 is manually released for each return stroke when it is not desired to raise the box structure from the fence post. The lower catch device 45 supports the box structure upon the ram rod 34 when being transported. The box structure 25 may be manually lifted any time upon the ram rod 34 by releasing the top catch device 42. There is sufficient play in the connection of the box structure with the ram 34 so that the catch devices 43 and 45 on the box structure can be readily detached from the respective notches 41 and 48 on the ram rod 34.

It should now be apparent that there has been provided a simple post driver for use on tractors and by which the power-operated hydraulic cylinder devices of the tractor can be used for actuating the post driver. The box structure 25 is slidable in the channel guide support 12 that is fixed to the tractor and the posts can be extended into the box from the lower end thereof by lifting the box out of the guide support and swinging it sideway to receive the fence post.

While various changes may be made in the detailed construction, it shall be understood that such changes shall be within the spirit and scope of the invention as defined by the appended claims.

What is claimed is:

1. A power-operated fence post driver comprising a vertically-extending guide support adapted to be mounted upon a tractor, a power-operated device mounted upon the upper end of the guide support, a box-like structure slidably operable in said guide support, said box-like structure having two guideways extending vertically therethrough, a top drive plate on the box structure closing one of said guideways, this one of said guideways being adapted to receive the upper end of a fence post for engagement by the top drive plate, a ram rod slidable through the other guideway of the box-like structure and connected to the power-operated cylinder device, said ram rod having vertically-spaced one way notches thereon, a catch device on the top drive plate of the box structure and engageable with the notches of the ram rod to provide a driving relationship between the ram rod and the box structure said catch ratcheting over said one way notches to permit upward movement of said ram rod by said power-operated device while said box remains in position on the top of the post, the return driving stroke of said ram rod engaging said catch in a successively lower notch as the post is driven into the ground.

2. A power-operated fence post driver comprising a vertically-extending guide support adapted to be mounted upon a tractor, a power-operated device mounted upon the upper end of the guide support, a box-like structure slidably operable in said guide support, said box-like structure having two guideways extending vertically therethrough, a top drive plate on the box structure closing one of said guideways, this one of said guideways adapted to receive the upper end of a fence post for engagement by the top drive plate, a ram rod slidable through the other guide way of the box-like structure and connected to the power-operated device, a catch device on the top plate of the box structure, said ram rod having a series of one way ratchet notches extending throughout the height of the same, said catch device being weighted and biased toward said notches and serving as a pawl for engagement therewith upon the ram rod being forced downwardly by the power-operated device and ratcheting over said notches upon the ram rod being retracted from the box structure upon its return stroke.

3. A power-operated fence post driver comprising a vertically-extending guide support adapted to be mounted upon a tractor, a power-operated device mounted upon the upper end of the guide support, a box-like structure slidably operable in said guide support, said box-like structure having two guideways extending therethrough, a top drive plate on the box structure closing one of said guideways, one of said guideways adapted to receive the upper end of a fence post for engagement by the top drive plate, a ram rod slidable through the other guideway of the box-like structure and connected to the power-operated device to be operated by the same, a catch device on the top plate of the box structure, said ram rod having a series of one way notches extending throughout the height of the same, said catch device being weighted and biased toward said notches for automatic engagement therewith upon the ram rod being forced downwardly by the power-operated device and for automatic release upon the ram rod being retracted from the box structure upon its return stroke, and said ram rod having other but oppositely-disposed one way notches on the lower end and a weighted catch device mounted on the lower end of the box structure and constantly biased into engagement with the other catch notches to effect the lifting up of the box structure by the ram rod from the upper end of the driven fence post free the box structure therefrom upon the completion of the operation.

References Cited in the file of this patent
UNITED STATES PATENTS

| | | |
|---|---|---|
| 2,551,897 | Notestein | May 8, 1951 |
| 2,634,092 | Lindquist | Apr. 7, 1953 |
| 2,681,789 | Nichols | June 22, 1954 |
| 2,742,258 | Rosasco | Apr. 17, 1956 |